United States Patent [19]

Hashimoto

[11] 4,378,907

[45] Apr. 5, 1983

[54] DUAL FUNCTION THERMAL VALVE

[75] Inventor: Nobuyuki Hashimoto, Toyota, Japan

[73] Assignee: Aisin Seiki Kabushiki Kaisha, Kariya, Japan

[21] Appl. No.: 271,693

[22] Filed: Jun. 8, 1981

Related U.S. Application Data

[63] Continuation of Ser. No. 98,752, Nov. 30, 1979, abandoned.

[30] Foreign Application Priority Data

Dec. 6, 1978 [JP] Japan .................................. 53-151754

[51] Int. Cl.³ ............................................. G05D 23/10
[52] U.S. Cl. .................................... 236/48 R; 236/87; 236/101 C
[58] Field of Search ................... 236/48 R, 87, 101 B, 236/101 C

[56] References Cited

U.S. PATENT DOCUMENTS

| | | | |
|---|---|---|---|
| 4,026,464 | 5/1977 | Doherty, Jr. ...................... | 236/87 X |
| 4,076,172 | 2/1978 | Inada et al. ........................ | 236/87 X |
| 4,117,976 | 10/1978 | Doherty, Jr. ...................... | 236/87 X |
| 4,133,478 | 1/1979 | Place ................................. | 236/48 R |
| 4,157,158 | 6/1979 | Kitamura et al. ................. | 236/87 X |
| 4,182,485 | 1/1980 | Kitamura ........................... | 236/48 R |

Primary Examiner—William E. Tapolcai
Attorney, Agent, or Firm—Oblon, Fisher, Spivak, McClelland & Maier

[57] ABSTRACT

An improved, dual function, thermal valve assembly has two passages and two valve mechanisms disposed in the passages, respectively. The assembly employs two thermally responsive actuating members which are actuatable to provide the dual functions in successive steps upon an increasing degree of temperature. The assembly is characterized by provision of a cavity to contain in isolation the thermally responsive actuating members from the passages to thereby avoid a tendency of thermal influence from the air flow passing through the passage.

6 Claims, 2 Drawing Figures

DUAL FUNCTION THERMAL VALVE

This is a continuation of application Ser. No. 098,752, filed Nov. 30, 1979, now abandoned.

BACKGROUND OF THE INVENTION

This invention relates to a dual thermal function valve incorporating bimetallic elements as actuating means and useful for instance in an automotive engine choke valve control system.

Various thermally actuated valves have been used particularly for automotive applications. These valves have proven successful but still these valves have been unsatisfactory for certain applications by allowing access of the air flow through the valve to the bimetallic elements thus causing the air flow to thermally affect and provide an inaccuracy of switching of the bimetallic elements. These valves have been unsatisfactory also for certain applications with remote locations of the bimetallic elements from an thermally conductive member, with a resulting defect of low sensing ability.

Accordingly, it is an object of this invention to provide an improved thermally responsive multi-function valve in which the functions can be switched accurately in sequence at different predetermined temperatures.

It is another object of the invention to provide a thermally responsive valve which is of better sensing ability and compact in size, reliable in operation and easy to construct.

SUMMARY OF THE INVENTION

The foregoing objects and others are attained according to at least one aspect of provision of a cavity in a valve body for isolatedly containing bimetallic elements from the air flow.

The double throw thermally responsive valve of this invention therefore comprises a valve body having at least two ports, a valve switching assembly having a pair of first and second valve mechanisms for forming in the valve body first and second fluid passageways communicating the ports, a cavity for isolatedly containing first and second bimetallic elements from the passageways, and first and second motion transfer members operatively connecting the first and second bimetallic elements respectively with the first and second valve mechanisms.

DESCRIPTION OF THE PREFERRED EMBODIMENT

Figure 1:
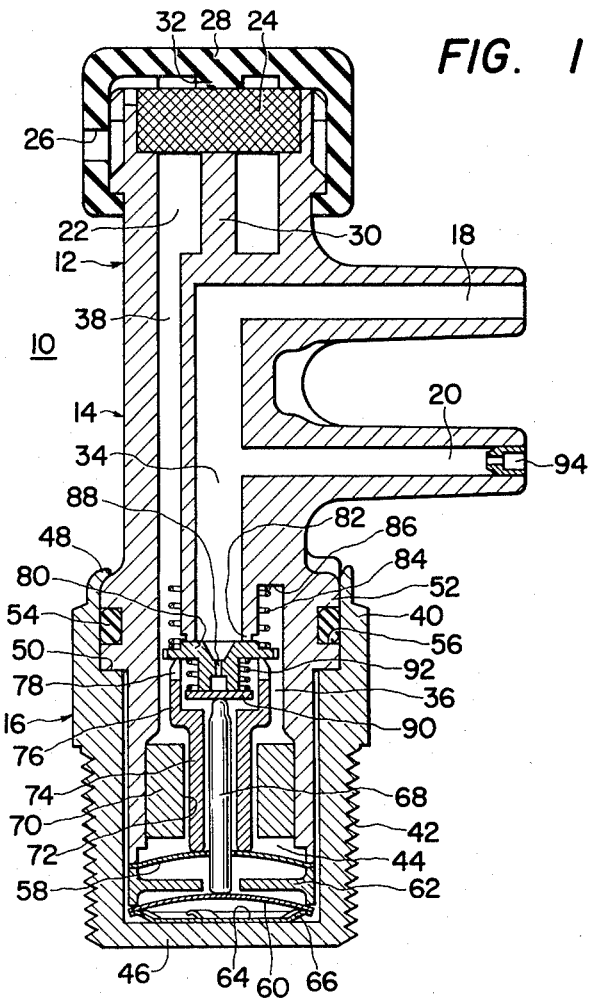
FIG. 1 is an axial sectional view of a double throw thermally responsive valve according to the present invention.

Referring now to the drawings, a dual function thermally responsive valve assembly 10 of this invention is shown in FIG. 1 as being embodied in a dual function thermal vacuum valve useful for instance automotive engine choke valve control system. The valve 10 has a two-part generally cylindrical body 12 comprising a first valve part 14 and a second valve part 16. As shown in FIG. 1, the first valve part 14 has input port 20 and an output port 18 which open generally perpendicular to the axis of the body part 14. Valve part 14, input and output ports 20 and 18 are preferably made from one piece of reinforced synthetic resin material such as glass-filled nylon. Output port 18 is typically connected with tubing (not shown) which runs between valve 10 and an actuator of a known engine choke valve while the other port 20 is typically connected with tubing (not shown) which runs between valve 10 and vacuum source such as an engine intake manifold. The body 12 has an air port 22 which is open to atmosphere across an air filter 24 and in turn through a hole 26 of a cap 28. A centrally located support post 30 cooperates with another central support post 32 of cap 28 to sustain air filter 24.

Input and output ports 20 and 18 connect with a central first path 34 which in turn connects with a central cavity 36 within first valve part 14. Central cavity 36 is in communication with air port 22 through a second path 38. Second valve part 16 is shown in FIG. 1 to comprise a cup-shaped member adapted to be sealingly secured to first part 14. Second valve part 16 further comprises a portion of thermally conductive material such as brass having a hollow externally threaded portion 42 and a central cavity 44 with preferably a flat bottom 46. Valve part 16 has a hexagonal shaped portion 40 enabling the valve assembly 10 to readily be screwed into a tapped bore in a wall of a water jacket of a vehicle engine. Valve part 16 further has a relatively thin wall 48 extending upwardly from the hexagonal shaped portion 40. A shoulder 50 is formed at the junction of wall 48 with the remainder of portion 40 and against a circular projection 52 of valve part 14 bears when the two parts 14 and 16 are assembled. A sealing gasket 54 such as an O-ring is disposed in a corresponding notched portion 56 of valve part 14 and is compressed when the two valve parts are assembled together to form valve body 12 with side wall 48 rolled over.

As shown in FIG. 1 a pair of first and second bimetallic elements 58 and 60 are captive in cavity 44 within second valve part 16. Bimetallic element 58 rests on a spacer member 62 at the circumferential edge and the spacer 62 in turn rests on second bimetallic element 60 at the circumferential edge. On the bottom 46 of second valve part 16 is a circular spring member 64 having a plurality of radially extending resilient tongues 66 on which rests second bimetallic element 60. The alignment of both bimetallic elements, spacer member 62 and spring member 64 is maintained by the internal face of second valve part 16. Central holes of bimetallic element 58 and spacer member 62 are of a diametrical size just large enough to allow free movement of a transfer pin 68.

Anchored within cavity 36 in first valve part 14 as by press fitting is a bushing 70 having an axially extending bore 72 running through bushing 70. Bore 72 serves to maintain proper alignment of a sleeve 74 and the size of bore 72 is large enough to movably receive sleeve 74. The alignment of transfer pin 68 is controlled by the sleeve 74 the axial bore of which has a diameter large enough to movably receive the pin 68. Sleeve 74 has a cup-shaped portion 76 having a plurality of slits 78 in its edge on which a first valve 80 rests. First valve 80 cooperates with an annular seat 82 in first valve part 14 to control fluid communication between path 34 and cavity 36. A coiled compressed spring 84 is anchored at the lower end to first valve 80 and at the other end to an annular portion 86 in first valve part 14, so that valve 80 is normally spring-urged downwardly. First valve 80 has a central orifice 88 to form a valve mechanism to be further described as the description proceeds. A second valve 90 rests on the uppermost end of transfer pin 68 adjacent to central orifice 88 and proper alignment of valve 90 is maintained by the internal face of cup-shaped portion 76. A coil spring 92 is compressed between first and second valves 80 and 90 so that valve 90 is also normally spring-urged downwardly. Second valve 90 serves to close or open central orifice 88 as described hereinbelow in greater detail.

Sleeve 74 rests on first bimetallic element 58 at the central portion of bimetallic element 58. A total of spring forces of first and second coil springs 80 and 90 is calculated to be less than that of the resilient forces of tongues 66 of spring member 64 so that valves 80 and 90 are held closed as shown in the rest position of the dual function thermally responsive valve 10.

Dish-shaped bimetallic elements 58 and 60 each have one layer of metal of a low thermal coefficient of expansion and another layer of metal of somewhat higher thermal coefficient of expansion so that at respective predetermined temperatures the elements will snap over center to an inverted dish-shaped configuration. The metal materials and the amount of preforming or dishing for the two bimetallic elements 58 and 60 are chosen such that they two snap over center at different temperatures. The two dish-shaped elements 58 and 60 are preferably positioned in the cavity so as to have an initial concave upward orientation with the low expansion side of the material facing upward in the view. The bimetallic assembly formed of bimetallic elements 58 and 60 has a first position when both first and second elements 58 and 60 are positioned concave upward as shown in FIG. 1, a second position when second bimetallic element 60 is concave downward and first element 58 is concave upward and a third position when first bimetallic element 58 is also concave downward.

The length of pin 68, the length of sleeve 76 and the lengths of snaps of both bimetallic elements are coordinated such that when bimetallic assembly is in the above first, second, or third position, both valves 80 and 90 are respectively in seated positions shown, second valve 90 is disengaged from first valve 80 to open orifice 88, or first valve 80 is also disengaged from seat 82.

Input port 20 is provided with an orifice member 94 having a predetermined admitting capacity which is compatible with the admitting capacity of each of first and second valve mechanisms formed by first and second valves 80 and 90, respectively.

Valve assembly 10 is particularly adapted to be threaded into an object, such as an automotive engine water jacket or the like, to transfer heat from the engine to bimetallic elements 58 and 60 so as to heat the elements in response to a corresponding temperature increase of the engine. Upon cooling of the engine, the elements will also be maintained at approximately the temperature of the engine.

Figure 2:
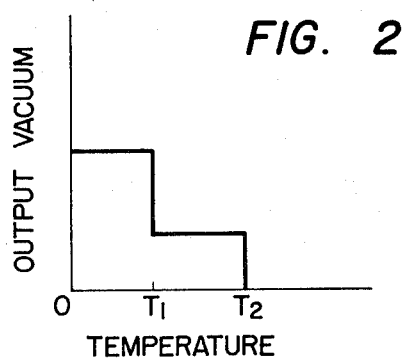
FIG. 2 is a graphical representation showing dual functions of the valve in response to varying temperatures.

When valve assembly 10 is installed in a cold engine, with port 20 connected with the engine intake manifold and port 18 connected with the engine choke valve actuator, bimetallic elements 58 and 60 are in the first position shown thus providing that all the valves 80 and 90 are closed as shown. In this condition an input vacuum at input port 20 is completely delivered from output port 18. As the engine heats up to say T1° C. as shown in FIG. 2, second bimetallic element 60 snaps to an inverted dish-shaped configuration thereby providing for second valve 90 to disengage from first valve 80 by the spring bias of spring 92. This condition allows for air flow passage through orifice 88. Then as the engine heats up more to say T2° C. in FIG. 2, bimetallic element 58 also snaps to an inverted dish-shaped configuration thereby providing for first valve 80 to also disengage from seat 82. This condition allows for a larger quantity air flow passage past opened valve 80. In this condition second valve 90 is held open, but the admitting capacity of the orifice 88 is negligible in achieving the operation. From the foregoing, it will be understood that the choke valve actuator can close the choke valve in a condition in which the engine is cold in the first position of the bimetallic elements. When the engine temperature increases in sequence as shown in FIG. 2, the choke valve can be correspondingly actuated to increase quantity of fluid flow therethrough.

Although the present invention has been shown and illustrated as embodied in the dual function thermal vacuum valve particularly adapted for a vehicle engine choke valve control system, it will be apparent that changes and modifications are possible without departing from the spirit and scope of the invention as defined in the appended claims.

It will be understood that the illustrated embodiment serves as adapted for vacuum or pressure control valve system. In the embodiment, orifice member 94 provides a quantitative standard of air stream through orifice 94. The vacuum at output port 18 is determined by ratio of the admitting capacity of first or second valve to the admitting capacity of orifice 94. First and second valves 80 and 90 respectively provide independent passages of different admitting capacity for the air flow therethrough whereas the admitting capacity of orifice 94 is kept constant. Accordingly, the vacuum at output port 18 changes in seccessive steps to an increasing degree of temperature as shown in FIG. 2.

In a modification lacking the port 20 of the embodiment of FIG. 1, the modification can be understood as being a fluid quantity controlling or adjusting valve for a fluid flow passing through the modification. It will be considered that such modification necessitates no illustration to be understood.

It is noted from what has been thus far described that sleeve 74 and pin 68 will cooperate with bushing 70 for chamber 44 to be substantially fluidly isolated from the air flow passing through the other chamber 36. This is the principal character of the invention for attaining to avoidance of thermal influence from the air flow to the thermal responsive character of the bimetallic assembly.

What is claimed is:

1. A thermally responsive valve assembly comprising two paths, a first valve mechanism, a second valve mechanism, said first and second valve mechanisms being interposed between the two paths to provide for two parallel passages joining the first and second paths, the second valve mechanism including an orifice and a valve and seat assembly for closing the orifice or opening the orifice to permit throttled flow between said two paths, said orifice having a cross sectional area smaller than either of said two paths, and said first valve mechanism, when open, permitting full flow between said two paths, said assembly further comprising a cavity disposed remotely from the valve mechanism, a first bimetallic element, a second bimetallic element, the first and second bimetallic elements being of different thermal responsive character and held in the cavity, two motion transfer members respectively operatively connecting the first and second bimetallic elements to the first and second valve mechanisms, and isolating means for isolating the cavity from the first and second valve mechanisms, whereby the first and second paths are fluidly connected through said orifice when in an open position, and whereby said orifice is bypassed by the first valve mechanism when said first valve mechanism is in an opened position.

2. A thermally responsive valve assembly as set forth in claim 1 wherein said isolating means comprises a bushing anchored within said body by press fitting and said first and said second motion transfer means, the first motion transfer means being in sleeve form and disposed in said bushing in movable relation therewith and the second motion transfer means being in pin form and disposed in the first motion transfer means in movable relation therewith.

3. A thermally responsive valve assembly as set forth in claim 1 wherein said first valve mechanism comprises a seat formed in a portion of said body and a first valve disposed adjacent to the seat.

4. A thermally responsive valve assembly as set forth in claim 2 wherein said bimetallic assembly further comprises a spacer having a ring form and said first and said second bimetallic elements have each a disc form of identical size with the spacer, said first bimetallic element resting on said spacer, said spacer resting on said second bimetallic element, said first bimetallic element having a central hole, said second motion transfer means extending through said central hole in movable relation therewith.

5. A thermally responsive valve assembly as set forth in claim 1 wherein said body has a thermally conductive member and said cavity is disposed in the thermally conductive member.

6. A thermally responsive valve assembly comprising two paths, a first valve mechanism, a second valve mechanism, said first and second valve mechanisms being interposed between the two paths to provide for two parallel passages joining the first and second paths, the second valve mechanism including an orifice and a valve and seat assembly for closing the orifice or opening the orifice to permit throttled flow between said two paths, and said first valve mechanism, when open, permitting full flow between said two paths, said assembly further comprising a cavity disposed remotely from the valve mechanisms, a first bimetallic element, a second bimetallic element, the first and second bimetallic elements being of different thermal responsive character and held in the cavity, two motion transfer members respectively operatively connecting the first and second bimetallic elements to the first and second valve mechanisms, and isolating means for isolating the cavity from the first and second valve mechanisms, whereby the first and second paths are fluidly connected through said orifice when in an open position, and whereby said orifice is bypassed by the first valve mechanism when said first valve mechanism is in an opened position, wherein said first valve mechanism comprises a seat formed in a portion of said body and a first valve disposed adjacent to the seat, wherein said first valve mechanism further comprises first spring means biasing said first valve against said first bimetallic element and said second valve mechanism further comprises second spring means anchored between said first and second valves to thereby normally urge said second valve to said second bimetallic element.

* * * * *